US009083459B2

United States Patent
Oda et al.

(10) Patent No.: US 9,083,459 B2
(45) Date of Patent: Jul. 14, 2015

(54) OPTICAL TRANSMISSION SYSTEM, METHOD OF TESTING OPTICAL TRANSMISSION SYSTEM, AND NON-TRANSITORY COMPUTER-READABLE MEDIUM

(71) Applicant: FUJITSU LIMITED, Kawasaki-shi, Kanagawa (JP)

(72) Inventors: Shoichiro Oda, Fuchu (JP); Yasuhiko Aoki, Yokohama (JP); Takeshi Hoshida, Kawasaki (JP); Kyosuke Sone, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/017,428

(22) Filed: Sep. 4, 2013

(65) Prior Publication Data

US 2014/0105596 A1    Apr. 17, 2014

(30) Foreign Application Priority Data

Oct. 12, 2012  (JP) .................................. 2012-226920

(51) Int. Cl.
| H04B 10/079 | (2013.01) |
| --- | --- |
| H04B 10/152 | (2006.01) |
| H04B 10/50 | (2013.01) |
| H04B 10/572 | (2013.01) |
| H04J 14/02 | (2006.01) |
| H04B 10/564 | (2013.01) |

(52) U.S. Cl.
CPC .......... *H04B 10/0795* (2013.01); *H04B 10/506* (2013.01); *H04B 10/564* (2013.01); *H04B 10/572* (2013.01); *H04J 14/0227* (2013.01)

(58) Field of Classification Search
CPC ... H04B 10/564; H04B 10/506; H04B 10/572
USPC ......................................... 398/196, 34, 25, 9
See application file for complete search history.

(56) References Cited

U.S. PATENT DOCUMENTS

| 2002/0063922 | A1* | 5/2002 | Berger et al. ................. 359/124 |
| 2002/0154858 | A1* | 10/2002 | Kojima .......................... 385/24 |
| 2006/0045520 | A1* | 3/2006 | Nakano et al. ................. 398/33 |
| 2008/0074731 | A1 | 3/2008 | Takeyama et al. |
| 2012/0141130 | A1 | 6/2012 | Nakashima et al. |
| 2014/0105596 | A1* | 4/2014 | Oda et al. ........................ 398/34 |

FOREIGN PATENT DOCUMENTS

| JP | 09-298511 | 11/1997 |
| JP | 2000-209155 | 7/2000 |
| JP | 2008-84923 | 4/2008 |
| JP | 2012-120010 | 6/2012 |

* cited by examiner

*Primary Examiner* — Oommen Jacob
(74) *Attorney, Agent, or Firm* — Fujitsu Patent Center

(57) ABSTRACT

An optical transmission system includes: an optical transmission device that has a plurality of optical transmitters configured to output at least one different wavelength and a multiplexer configured to multiplex wavelength lights output by the plurality of optical transmitters and output a multiplexed wavelength light; and a detection unit configured to detect each wavelength light that is branched before being fed into the multiplexer by sweeping an objective wavelength for detection, wherein, in a single sweeping, the detection unit selects and detects two or more wavelength lights with a wavelength interval that is wider than a wavelength interval of an output light of the multiplexer.

5 Claims, 11 Drawing Sheets

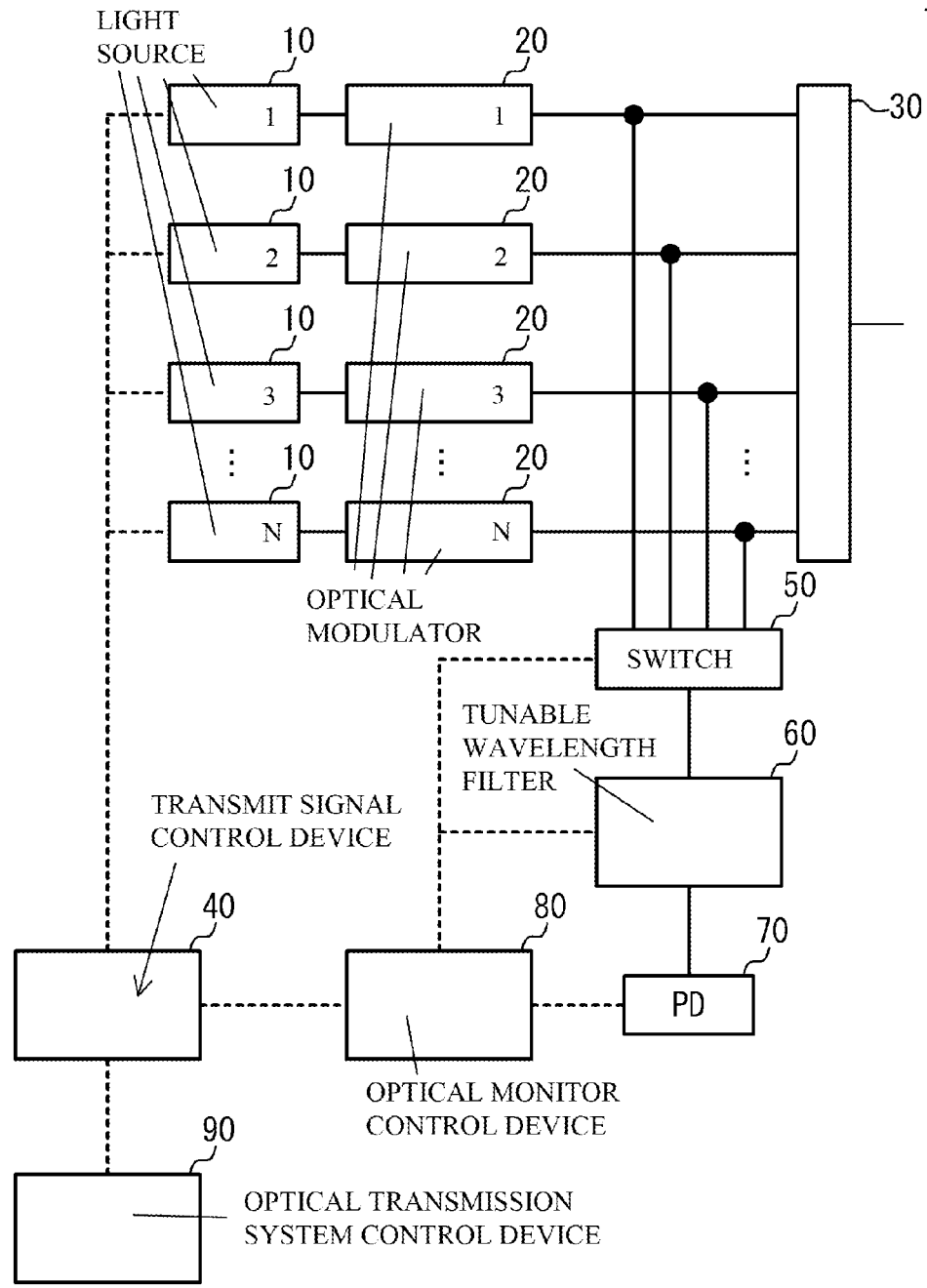

FIRST SWEEPING

SECOND SWEEPING

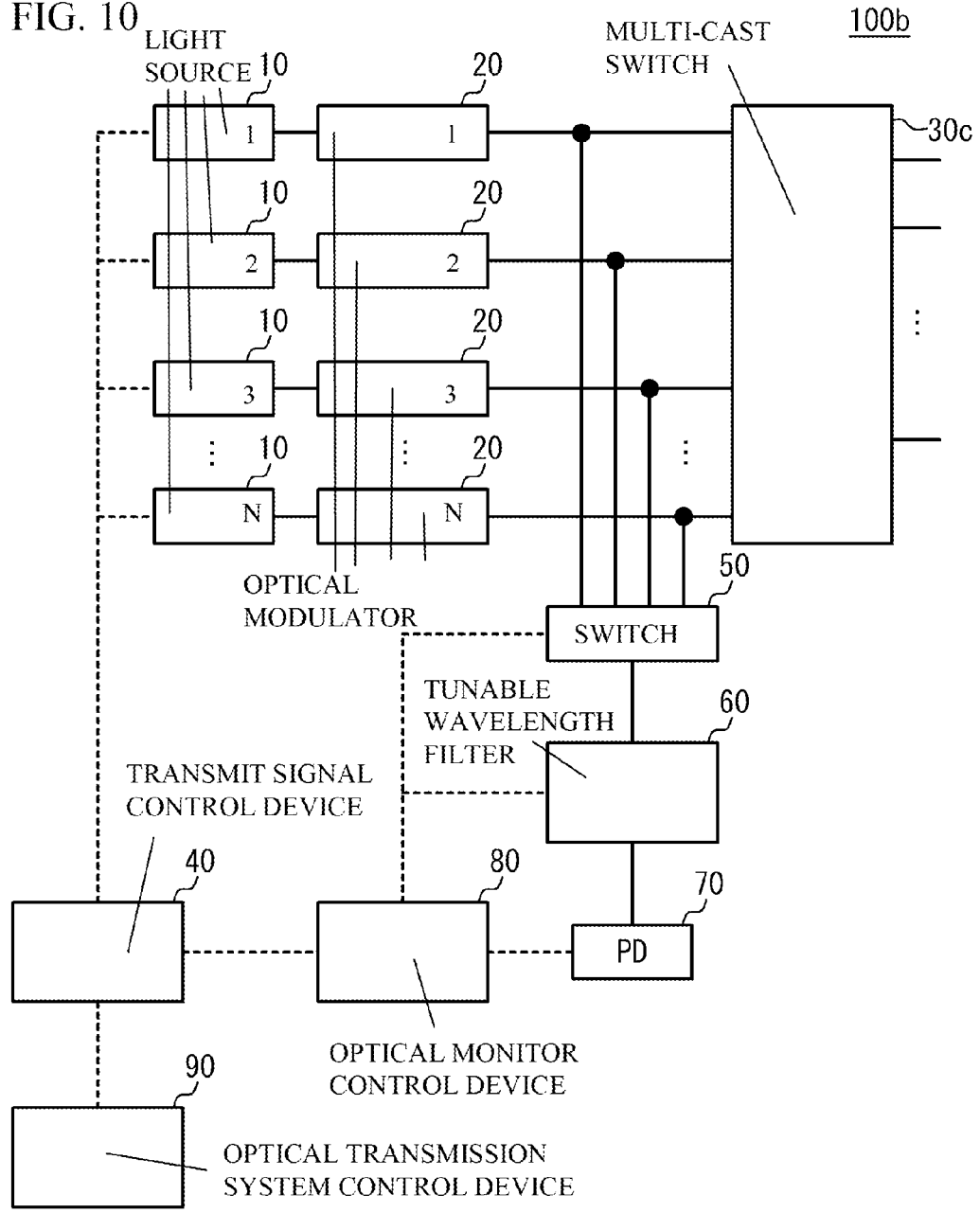

| | WAVALENGTH | | | | | |
|---|---|---|---|---|---|---|
| | $\lambda_1$ | $\lambda_2$ | $\lambda_3$ | $\lambda_4$ | $\lambda_5$ | $\lambda_5$ |
| PORT NUMBER | 1 | 5 | 2 | 4 | 3 | 6 |

US 9,083,459 B2

OPTICAL TRANSMISSION SYSTEM, METHOD OF TESTING OPTICAL TRANSMISSION SYSTEM, AND NON-TRANSITORY COMPUTER-READABLE MEDIUM

CROSS-REFERENCE TO RELATED APPLICATION

This application is based upon and claims the benefit of priority of the prior Japanese Patent Application No. 2012-226920, filed on Oct. 12, 2012, the entire contents of which are incorporated herein by reference.

FIELD

A certain aspect of embodiments described herein relates to an optical transmission system, a method of testing an optical transmission system, and a program of testing an optical transmission system.

BACKGROUND

Japanese Patent Application Publication No. 2008-84923 discloses a technology in which an OCM (Optical Channel Monitor) monitors each signal wavelength obtained when a WDM (Wavelength Division Multiplexing) light passes through a tunable wavelength filter.

SUMMARY

According to an aspect of the present invention, there is provided an optical transmission system including: an optical transmission device that has a plurality of optical transmitters configured to output at least one different wavelength and a multiplexer configured to multiplex wavelength lights output by the plurality of optical transmitters and output a multiplexed wavelength light; and a detection unit configured to detect each wavelength light that is branched before being fed into the multiplexer by sweeping an objective wavelength for detection, wherein, in a single sweeping, the detection unit selects and detects two or more wavelength lights with a wavelength interval that is wider than a wavelength interval of an output light of the multiplexer.

BRIEF DESCRIPTION OF DRAWINGS

FIG. 1 illustrates a block diagram of a main structure of an optical transmission device in accordance with a first embodiment;

FIG. 10 illustrates a block diagram of a main structure of another optical transmission system;

DESCRIPTION OF EMBODIMENTS

Figure 2A:
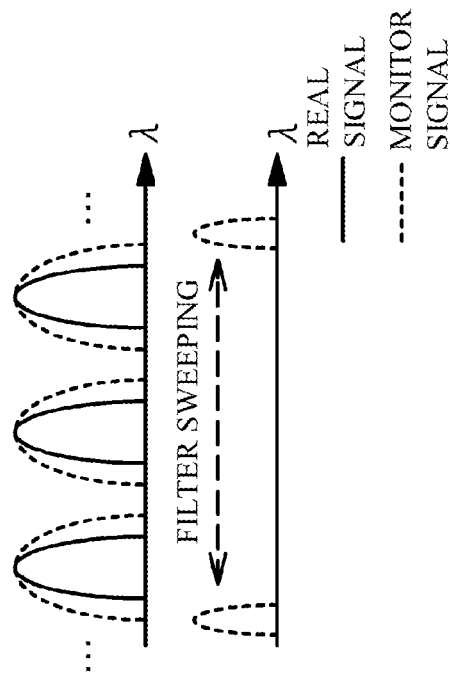
FIG. 2A illustrates a general WDM transmission device.

It is difficult for a conventional OCM to perform a sufficient resolution capability with respect to a wavelength-multiplexed light of an OFDM (Orthogonal Frequency Division Multiplexing) technology, a Nyquist WDM technology or the like because of a filter width.

The following is a description of embodiments, with reference to the accompanying drawings.

FIG. 1 illustrates a block diagram of a main structure of an optical transmission system 100 in accordance with an embodiment. The optical transmission system 100 multiplexes wavelength lights of N channels and transmits the multiplexed wavelength lights. As illustrated in FIG. 1, the optical transmission system 100 has a light source 10, an optical modulator 20, a multiplexer 30, a transmit-signal control device 40, a switch 50, a tunable wavelength filter 60, a light-receiving element 70, an optical monitor control device 80 and an optical transmission system control device 90.

In the optical transmission system 100, the light source 10 and the optical modulator 20 are provided according to each channel. That is, the optical transmission system 100 has N sets of the light sources 10 and the optical modulators 20. The light source 10 and the optical modulator 20 act as an optical transmitter. The light source 10 is a device for outputting a wavelength light of a single wavelength such as a semiconductor laser. The light source 10 outputs a different wavelength light in accordance with the channel. The optical modulator 20 is a device for modulating a wavelength light output by the light source 10 and outputting the modulation signal. The multiplexer 30 multiplexes modulation signals output by the optical modulators 20 and transmits the wavelength-multiplexed signal to a light-receiver. The light source 10, the optical modulator 20 and the multiplexer 30 act as an optical transmission device.

The transmit-signal control device 40 is a device for controlling an optical signal transmitted from each of the light sources 10. For example, the transmit-signal control device 40 controls on/off of each of the light sources 10.

The transmit-signal control device 40 controls a wavelength, an optical intensity and so on of the optical signal transmitted from each of the light sources 10.

A part of the modulation signal fed into the multiplexer 30 from the optical modulator 20 is branched into the switch 50. A beam splitter or the like is used for branching the modulation signal. The switch 50 is capable of an N:1 switching, selects a channel from the N channels and inputs a modulation signal of the selected channel into the tunable wavelength filter 60. That is, the switch 50 switches a wavelength by a wavelength light and input the selected wavelength light into the tunable wavelength filter 60. The switch 50 switches the channel in accordance with an instruction of the optical monitor control device 80.

The tunable wavelength filter 60 is a wavelength filter of which transparent wavelength fluctuates in accordance with an electrical signal input thereinto, and has a band width for selectively transmitting each wavelength signal branched before being input into the multiplexer 30. The tunable wavelength filter 60 changes the transparent wavelength in accordance with an instruction of the optical monitor control device 80. The light-receiving element 70 converts an optical intensity of a light having passes through the tunable wavelength filter 60 into an electrical signal and inputs the electrical signal into the optical monitor control device 80.

The optical monitor control device 80 is a device for detecting a wavelength characteristic of the wavelength light of each channel. The optical transmission system control device 90 is a device for performing an overall control of the optical transmission system 100. For example, the optical monitor control device 80 detects a wavelength of the wavelength light of each channel and tests whether a desired wavelength instructed by the optical transmission system control device 90 is output. The optical monitor control device 80 detects an optical intensity of the wavelength light of each channel, and tests whether a desired optical intensity instructed by the optical transmission system control device 90 is achieved.

The optical monitor control device 80 controls a switching of the switch 50, controls the transparent wavelength of the tunable wavelength filter 60, and detects the wavelength light of each channel by receiving an electrical signal from the light-receiving element 70. In concrete, the optical monitor control device 80 controls the switch 50 so that a modulation signal of a predetermined channel is input into the tunable wavelength filter 60, controls the transparent wavelength of the tunable wavelength filter 60 to the wavelength of the predetermined channel in synchronization with the switching of the switch 50, and receives an electrical signal from the light-receiving element 70. It is therefore possible to detect the wavelength light of the predetermined channel separately. For example, the optical monitor control device 80 detects the wavelength light of each channel (filter sweeping) by sweeping a wavelength for detection from a shorter wavelength side to a longer wavelength side or from a longer wavelength side to a shorter wavelength side so that the wavelength range of each channel is covered. In the embodiment, the switch 50, the tunable wavelength filter 60, the light-receiving element 70 and the optical monitor control device 80 act as an OCM (Optical Channel Monitor) that detects each wavelength light branched before being fed into the multiplexer 30.

A description will be given of the filter sweeping. FIG. 2A illustrates an ordinal WDM transmission device 200. An optical transmitter 201 is a light source and an optical modulator. A multiplexer 202 multiplexes modulation lights output by each of the optical transmitters 201. An OCM 203 is a tunable wavelength filter, a light-receiving element and a monitor device.

Figure 2B:
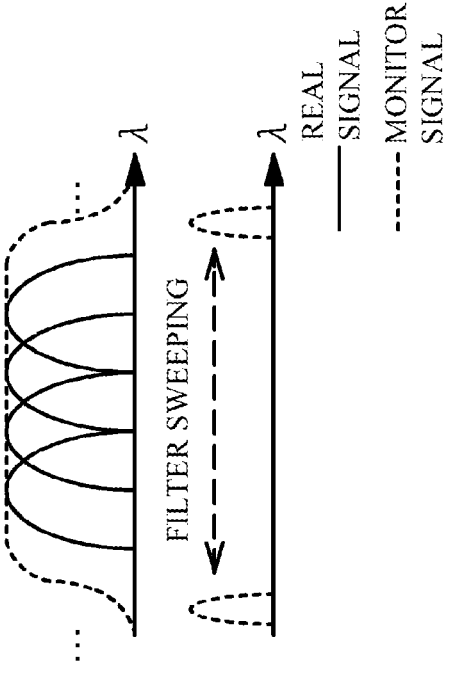
FIG. 2B illustrates a monitor signal obtained by a filter sweeping.

FIG. 2B illustrates a monitor signal obtained by the filter sweeping. In FIG. 2B, a horizontal axis indicates a wavelength, and a vertical axis indicates an optical intensity. As illustrated in FIG. 2B, a spectrum of each wavelength light can be detected as a monitor signal, when the OCM 203 sweeps a transparent wavelength of the tunable wavelength filter from a shorter wavelength side to a longer wavelength side or from a longer wavelength side to a shorter wavelength side.

There is a limitation to a wavelength resolution capability of the OCM 203. Therefore, a spectrum width of a monitor signal detected with use of the light-receiving element tends to be wider than a spectrum width of a real signal.

However, in an ordinal WDM, a wavelength interval of each wavelength light is set to be wide. Therefore, an overlapping between spectrums of monitor signals detected with respect to each wavelength light is suppressed. It is therefore possible to detect each wavelength light with high accuracy.

Figure 2C:
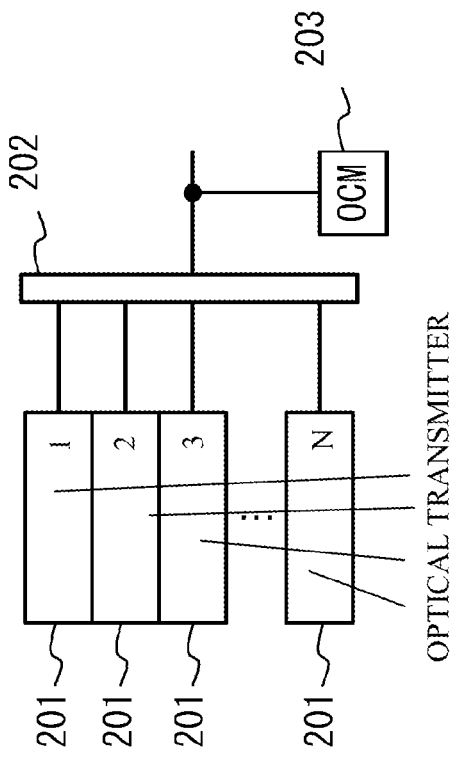
FIG. 2C illustrates a filter sweeping with respect to a sub-channel signal obtained by Nyquist-WDM technology.

FIG. 2C illustrates a filter sweeping with respect to a sub channel signal (wavelength light) obtained by using Nyquist-WDM technology. In FIG. 2C, a horizontal axis indicates a wavelength, and a vertical axis indicates an optical intensity. As illustrated in FIG. 2C, in the Nyquist-WDM technology, a wavelength interval of each wavelength light is narrow. When a cross talk occurs between adjacent channels, a single spectrum is detected as a monitor signal with respect to a plurality of wavelength lights. In this case, a spectrum width of the monitor signal gets larger. Thus, detection accuracy of a wavelength (for example, a center wavelength) of each wavelength light is degraded. That is, it may be difficult to detect each wavelength light with high accuracy.

Figure 2D:
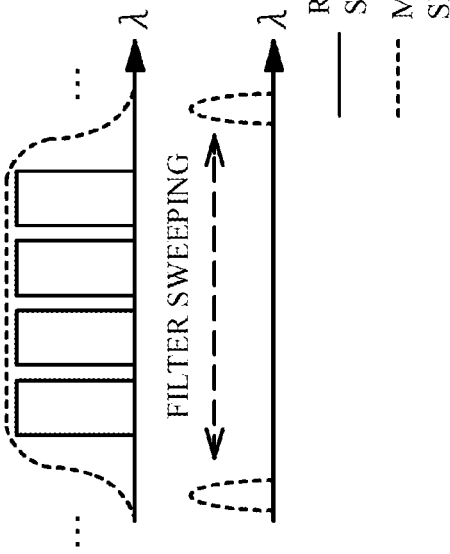
FIG. 2D illustrates a filer sweeping with respect to a sub-channel signal obtained by OFDM technology.

FIG. 2D illustrates a filter sweeping with respect to a sub channel signal (wavelength light) obtained by using OFDM technology. In FIG. 2D, a horizontal axis indicates a wavelength, and a vertical axis indicates an optical intensity. As illustrated in FIG. 2D, in the OFDM technology, a wavelength interval of each wavelength light is narrow. And each spectrum of a real signal is partially overlapped with each other. When a cross talk occurs between adjacent channels, a single spectrum is detected as a monitor signal with respect to a plurality of wavelength lights. In this case, a spectrum width of the monitor signal gets larger. Thus, detection accuracy of a wavelength (for example, a center wavelength) of each wavelength light is degraded. That is, it may be difficult to detect each wavelength light with high accuracy.

In contrast, the optical transmission system 100 in accordance with the embodiment secures a resolution capability by detecting a wavelength light of each channel with a wavelength interval that is wider than a wavelength interval of a wavelength-multiplexed light obtained in the multiplexer 30 in a single filter sweeping. A description will be given of the details.

Figure 3D:
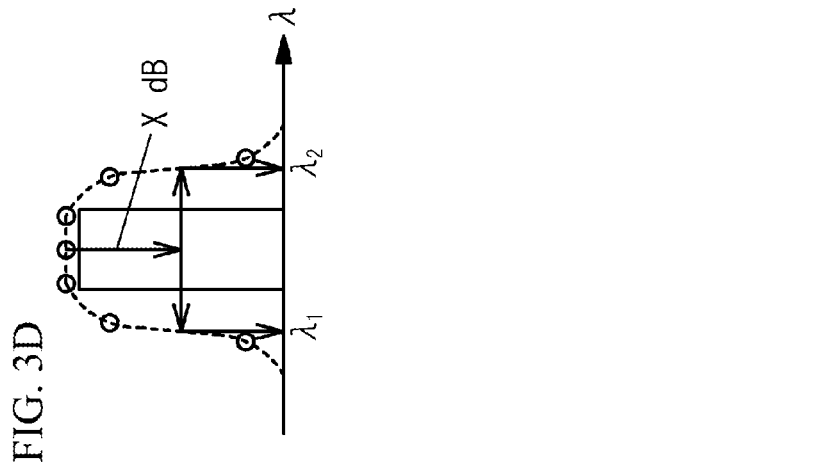
FIG. 3D illustrates a concrete example of wavelength detection of each wavelength light.
Figure 3A:
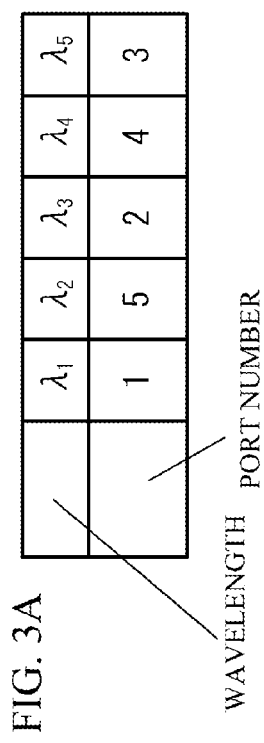
FIG. 3A illustrates a correspondence table for describing a relation between a port number and each channel of a switch.

FIG. 3A illustrates a correspondence table for describing a relation between a port number of the switch 50 and each channel. An example of FIG. 3A includes a relation between the port number of the switch 50 and a wavelength of a wavelength light fed into each port. In order to simplify an explanation, a description will be given of a relation between port numbers 1 to 5 and wavelengths $\lambda 1$ to $\lambda 5$. The wavelengths $\lambda 1$ to $\lambda 5$ correspond to channels that are adjacent to each other. The larger the wavelength number is, the longer the wavelength is.

The optical monitor control device 80 selects at least two channels with a wavelength interval that is wider than a wavelength interval of a wavelength-multiplexed light in a first filter sweeping. In other words, the optical monitor control device 80 selects at least two channels so that selected wavelengths are not next to each other. For example, the optical monitor control device 80 selects the wavelength $\lambda 1$, the wavelength $\lambda 3$ and the wavelength $\lambda 5$. The optical monitor control device 80 sets port numbers corresponding to the selected channels in a first sequence. The sequence corresponds to a switching order and a switching time of the switch 50. Next, the optical monitor control device 80 selects at least two channels with a wavelength interval that is wider than the wavelength interval of the wavelength-multiplexed light in a second filter sweeping. For example, the optical monitor control device 80 selects the wavelength λ2 and the wavelength λ4. The optical monitor control device 80 sets port numbers corresponding to the selected channels in a second sequence. Similarly, the optical monitor control device 80 selects channels in accordance with a third sweeping or later and sets port numbers corresponding to the selected channels in a third sequence or later until all channels are selected.

Figure 3B:
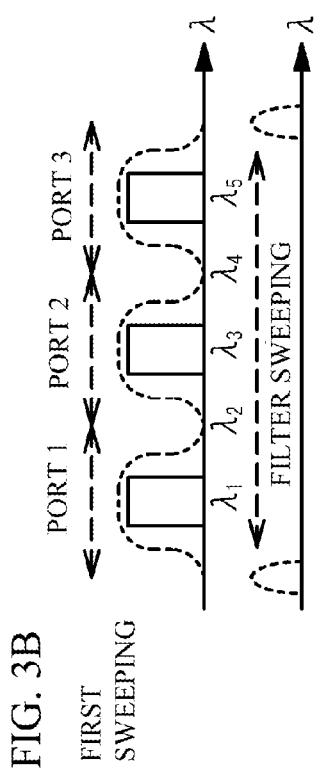
FIG. 3B and FIG. 3C illustrate a filter sweeping.

Next, the optical monitor control device 80 controls the switch 50 in accordance with an obtained sequence. In concrete, as illustrated in FIG. 3B, in the first filter sweeping, the switch 50 selects a port 1 when the transparent wavelength of the tunable wavelength filter 60 is the wavelength λ1, the switch 50 selects a port 2 when the transparent wavelength of the tunable wavelength filter 60 is the wavelength λ3, and the switch 50 selects a port 3 when the transparent wavelength of the tunable wavelength filter 60 is the wavelength λ5. Thus, in the first filter sweeping, the wavelength lights of the wavelengths λ1, λ3, and λ5 can be detected.

Figure 3C:
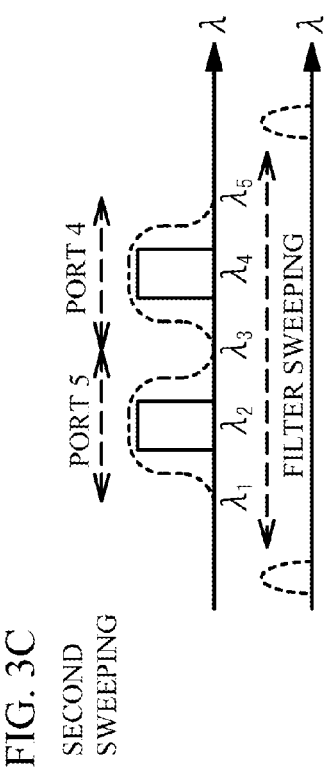

Next, as illustrated in FIG. 3C, in the second filter sweeping, the switch 50 selects a port 5 when the transparent wavelength of the tunable wavelength filter 60 is the wavelength λ2, and the switch 50 selects a port 4 when the transparent wavelength of the tunable wavelength filter 60 is the wavelength λ4. Thus, in the second filter sweeping, the wavelength lights of the wavelengths λ2 and λ4 can be detected. In this way, the wavelength interval of detected wavelengths gets larger, compared to a case where the wavelengths λ1 to λ5 are detected in a single filter sweeping. Thus, the resolution capability during detecting each wavelength light can be secured.

FIG. 3D illustrates a concrete example of a wavelength detection of each wavelength light. As illustrated in FIG. 3D, the optical monitor control device 80 uses a maximum level value of the detected optical intensity and two points before and after the optical intensity and calculates a peak level of the wavelength lights with use of a quadratic function fitting or the like. Next, the optical monitor control device 80 obtains a longer side wavelength (λ2 in FIG. 3D) and a shorter side wavelength (λ1 in FIG. 3D) of which levels are reduced by a predetermined value (X dB in FIG. 3D) from the calculated peak level. The optical monitor control device 80 calculates a center wavelength λc=0.5 (λ1 +λ2) that is a center between the wavelength λ1 and the wavelength λ2. The optical monitor control device 80 detects the center wavelength λc as a wavelength of a wavelength light. The wavelength detection is not limited to the example of FIG. 3D. For example, a wavelength of a maximum level value may be detected as the wavelength of the wavelength light.

The optical monitor control device 80 instructs the transmit-signal control device 40 to correct an output wavelength of the light source 10 of the channel, when there is a difference between the detected wavelength and a wavelength received from the optical transmission system control device 90. The optical monitor control device 80 instructs the transmit-signal control device 40 to correct an output optical intensity of the light source 10 of the channel, when there is a difference between an optical intensity at the detected wavelength and an optical intensity received from the optical transmission system control device 90. The optical monitor control device 80 may instruct correcting of another parameter. The optical monitor control device 80 and the transmit-signal control device 40 act as a correct unit.

Figure 4:
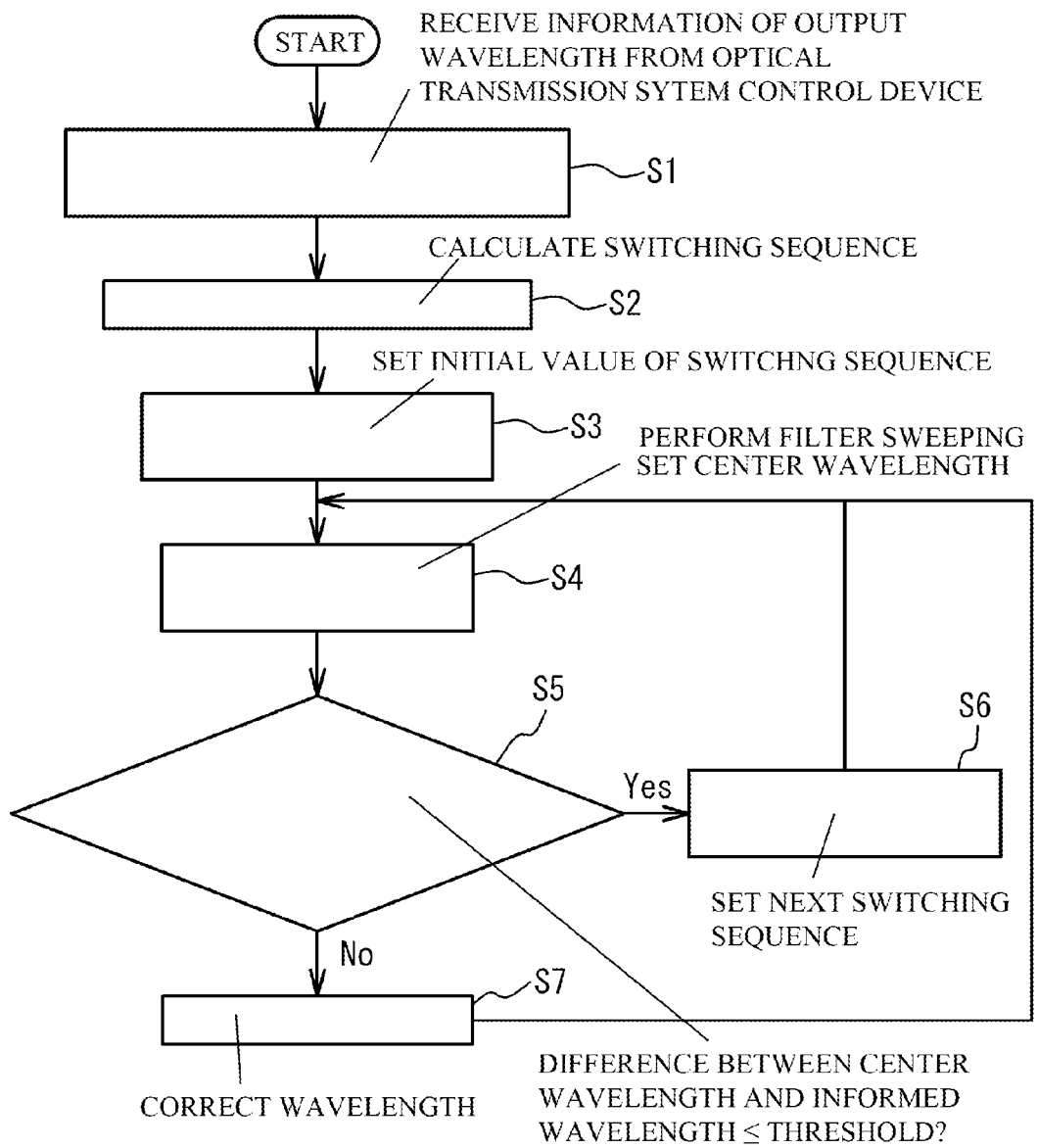
FIG. 4 illustrates a flowchart for describing an operation of an optical monitor control device.

FIG. 4 illustrates a flowchart for describing an example of an operation of the optical monitor control device 80. As illustrated in FIG. 4, the optical monitor control device 80 receives information of an output wavelength of each channel from the optical transmission system control device 90 (Step S1). Next, the optical monitor control device 80 calculates a sequence for switching (Step S2). The optical monitor control device 80 calculates a sequence in accordance with a flowchart of FIG. 5, as an example.

Figure 5:
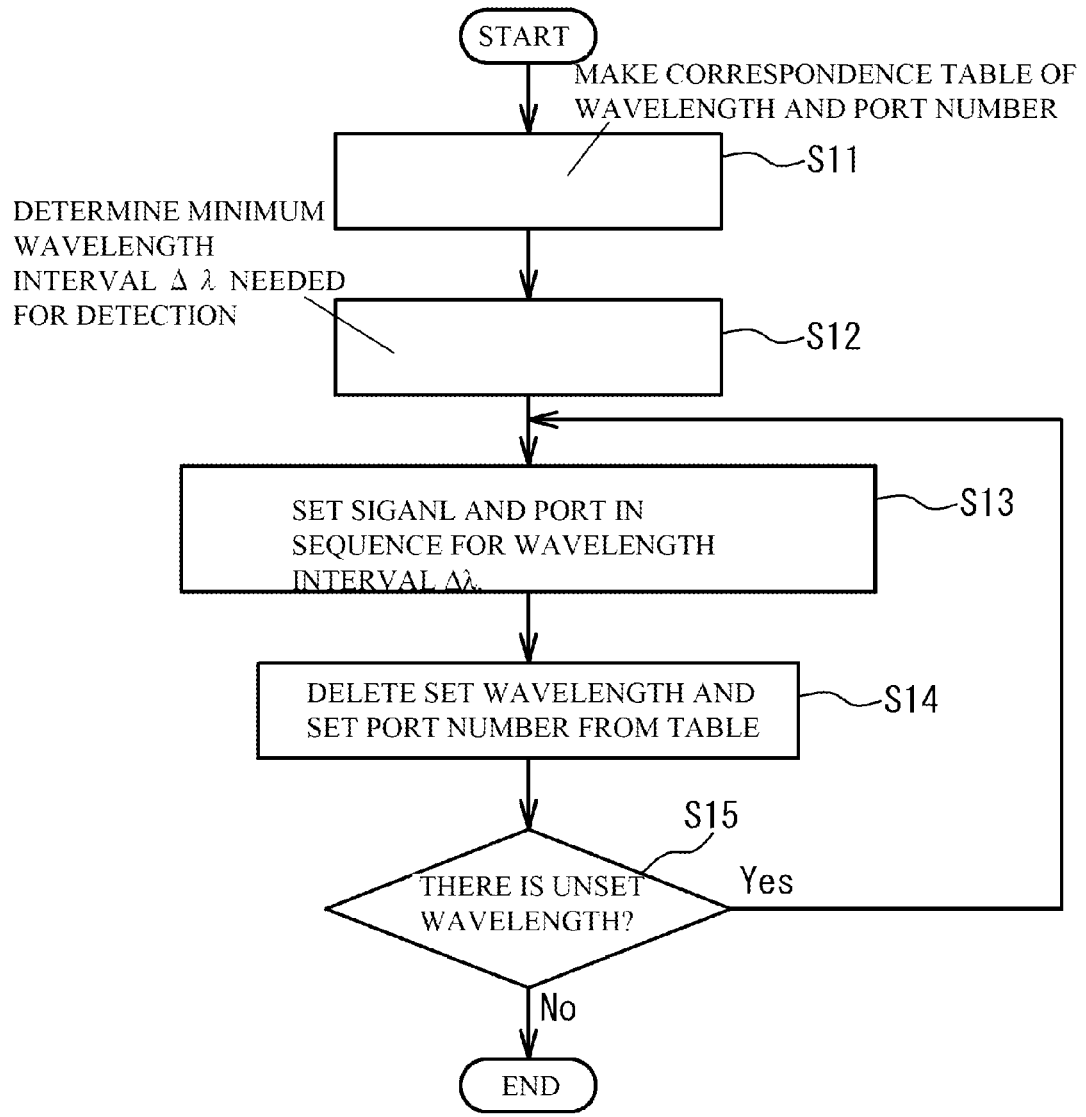
FIG. 5 illustrates a flowchart for describing a calculation of a sequence.

As illustrated in FIG. 5, the optical monitor control device 80 makes a correspondence table of a wavelength of a wavelength light of each channel and a port number of the switch 50 (Step S11). Next, the optical monitor control device 80 determines a minimum wavelength interval Δλ that is necessary for detection of a wavelength light (Step S12). The minimum wavelength interval Δλ may be determined in accordance with a band width of the tunable wavelength filter 60, a spectrum width of each wavelength light and so on.

Next, the optical monitor control device 80 selects two or more channels from a shorter wavelength side (or longer wavelength side) so that a wavelength interval is Δλ or more and sets the selected channels in a sequence (Step S13). Next, the optical monitor control device 80 deletes the set wavelength the set port number from the correspondence table (Step S14). Next, the optical monitor control device 80 determines whether there is a wavelength that is not set (Step S15). When it is determined as "Yes" in the Step S15, the Step S13 is executed again. When it is determined as "No" in the Step S15, the flowchart of FIG. 5 is terminated.

With reference to FIG. 4 again, after termination of the flowchart of FIG. 5, the optical monitor control device 80 sets an initial value of the sequence (Step S3). Next, the optical monitor control device 80 performs the sequence in which the initial value is set in synchronization with the filter sweeping, and measures a center wavelength of each detected wavelength light (Step S4). Next, the optical monitor control device 80 determines whether a difference between the measured center wavelength and a wavelength received from the optical transmission system control device 90 is equal to a threshold or less (Step S5). When it is determined as "Yes" in the Step S5, the optical monitor control device 80 sets a next sequence (Step S6). After that, the Step S4 is executed again. When it is determined as "No" in the Step S5, the transmit-signal control device 40 corrects a center wavelength of the light source 10 of the channel where it is determined that the difference is equal to the threshold or more to the wavelength received from the optical transmission system control device 90 (Step S7). After that, the Step S4 is executed again. The flowchart of FIG. 4 is terminated when all sequences are executed.

In accordance with the embodiment, in a single filter sweeping, it is possible to select and detect a wavelength light with a wavelength interval that is wider than a wavelength interval of the wavelength-multiplexed light obtained in the multiplexer 30. It is therefore possible to secure a resolution capability with respect to a wavelength light of the optical monitor control device 80. Accordingly, each wavelength light can be detected with high accuracy. It is thought that only one wavelength light is detected in a single filter sweeping. However, in this case, it is necessary to perform N filter sweepings in an optical transmission device of N channels. In contrast, in the embodiment, wavelength lights of at least two channels are an objective in a single filter sweeping. Therefore, increasing of a number of the filter sweeping can be suppressed. In accordance with the embodiment, the increasing of the number of the filter sweeping can be suppressed, and each wavelength light can be detected with high accuracy.

It is not necessary that wavelength lights of two or more channels are an objective in all filter sweepings. Two or more wavelength lights have only to be an objective in at least one filter sweeping. For example, the wavelength λ1 and the wavelength λ3 may be an objective in the first filter sweeping, the wavelength λ2 and the wavelength λ4 may be an objective in the second filter sweeping and the wavelength λ5 may be an objective in the third filter sweeping. In this case, the number of the filter sweeping can be reduced, compared to a case where only a single wavelength light is detected in each filter sweeping.

It is not necessary that a wavelength interval between all wavelength lights is widened. The detection accuracy of a wavelength light can be improved when a wavelength interval of at least two wavelength lights is widened. For example, with respect to the wavelengths λ1 to λ5, when a wavelength interval between the wavelength λ4 and the wavelength λ5 is equal to the above-mentioned minimum wavelength interval Δλ or more, the wavelength λ4 and the wavelength λ5 may be an objective in a single filter sweeping. For example, the wavelength λ1 and the wavelength λ3 may be an objective in the first filter sweeping, the wavelength λ2, the wavelength λ4 and the wavelength λ5 may be an objective in the second filter sweeping.

Figure 6A:
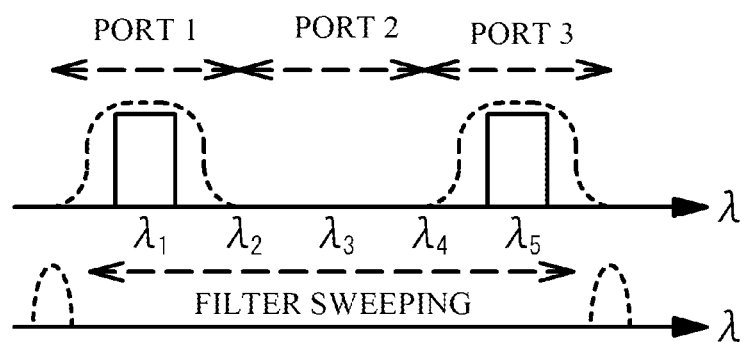
FIG. 6A illustrates a case where a light source for outputting a wavelength light to a port 2 wrongly outputs a wavelength light of a wavelength Xl.
Figure 6B:
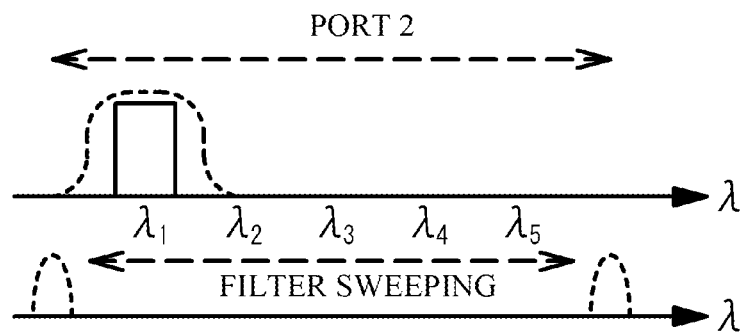
FIG. 6B illustrates a filter sweeping.

Next, a description will be given of a case where wavelength lights of an identical wavelength are output in a plurality of channels. FIG. 6A illustrates an example where the light source 10 outputting a wavelength light to the port 2 wrongly outputs a wavelength light of the wavelength λ1. As illustrated in FIG. 6A, when the wavelength λ1, the wavelength λ3 and the wavelength λ5 are an objective in a filter sweeping, the wavelength λ3 is not detected or a detected optical intensity of the wavelength λ3 gets smaller. In this case, the optical monitor control device 80 controls the switch 50 to keep selecting the port 2, and performs a filter sweeping, as illustrated in FIG. 6B. Thus, the wavelength of the wavelength light fed into the port 2 can be detected. In the example of FIG. 6B, the wavelength light of the wavelength λ1 is detected.

Figure 7:
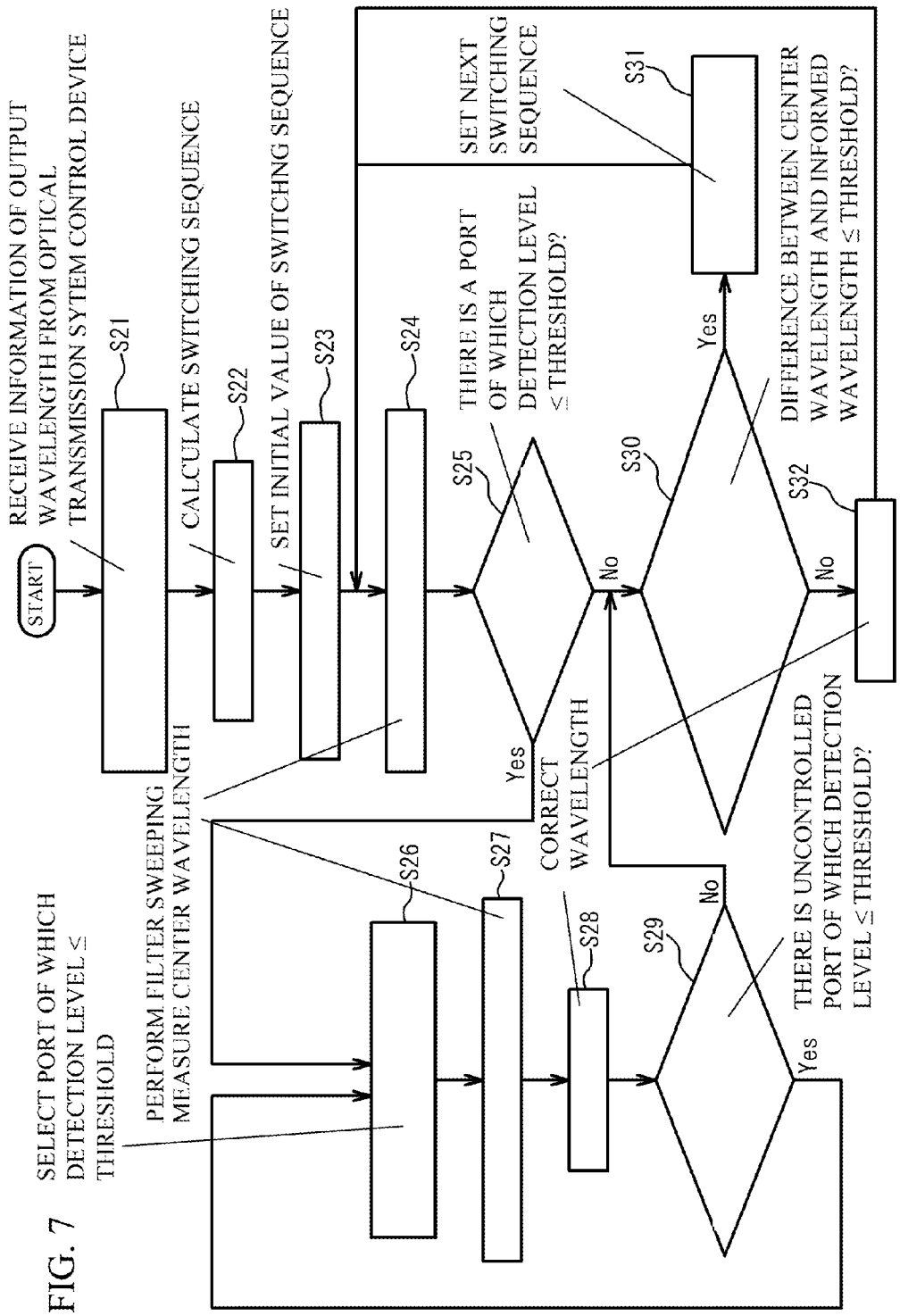
FIG. 7 illustrates another example of a flowchart describing an operation of an optical monitor control device.

FIG. 7 illustrates another example of a flowchart describing the operation of the optical monitor control device 80. As illustrated in FIG. 7, Steps S21 to S24 are the same as the Steps S1 to S4 of FIG. 4. After executing the Step S24, the optical monitor control device 80 determines whether there is a port of which detected level is equal to a threshold or less (Step S25). When it is determined as "Yes" in the Step S25, the optical monitor control device 80 switches a port of the switch 50 to another port of which detected level is equal to the threshold or less (Step S26).

Next, the optical monitor control device 80 performs a filter sweeping and measures a center wavelength of the detected wavelength light (Step S27). Next, the optical monitor control device 80 corrects a center wavelength of the light source 10 of the channel of which detected level is equal to the threshold or less to the wavelength received from the optical transmission system control device 90 (Step S28). Next, the optical monitor control device 80 determines whether there is an uncontrolled port of which detected level is equal to the threshold or less (Step S29). The uncontrolled port is a port where the Steps S26 to S28 are not executed. When it is determined as "Yes" in the Step S29, the Step S26 is executed again. When it is determined as "No" in the Step S29, the optical monitor control device 80 executes Steps S30 to S32 that are the same as the Steps S5 to S7 of FIG. 4. The flowchart of FIG. 7 is terminated when all sequences are executed.

When ports of which detected level is equal to a threshold or less is selected and a filter sweeping is performed, an output wavelength of the port can be detected. It is therefore possible to correct the output wavelength to a desired wavelength.

Figure 8:
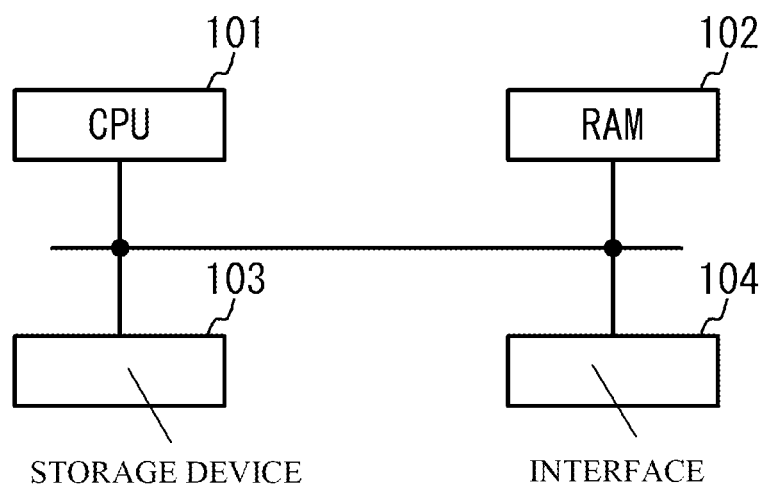
FIG. 8 illustrates a block diagram of a hardware structure of an optical monitor control device.

FIG. 8 illustrates a block diagram for describing a hardware structure of the optical monitor control device 80. As illustrated in FIG. 8, the optical monitor control device 80 has a CPU 101, a RAM 102, a storage device 103, an interface 104 and so on. These components are connected via a bus or the like. The CPU 101 is a Central Processing Unit. The CPU 101 includes one or more core. The RAM (Random Access Memory) 102 is a volatile memory for temporarily storing a program executed by the CPU 101, a data processed by the CPU 101 and so on. The storage device 103 is non-volatile storage device. A ROM (Read Only Memory), a solid state drive (SSD) such as a flash memory, a hard disk driven by a hard disk drive or the like can be used as the storage device 103. When the CPU 101 executes a predetermined program, the optical monitor control device 80 is realized in the optical transmission system 100. The transmit-signal control device 40 and the optical transmission system control device 90 may be realized when the CPU 101 executes the program. The transmit-signal control device 40, the optical monitor control device 80 and the optical transmission system control device 90 may be a hardware such as a dedicated circuit or the like.

Figure 9:
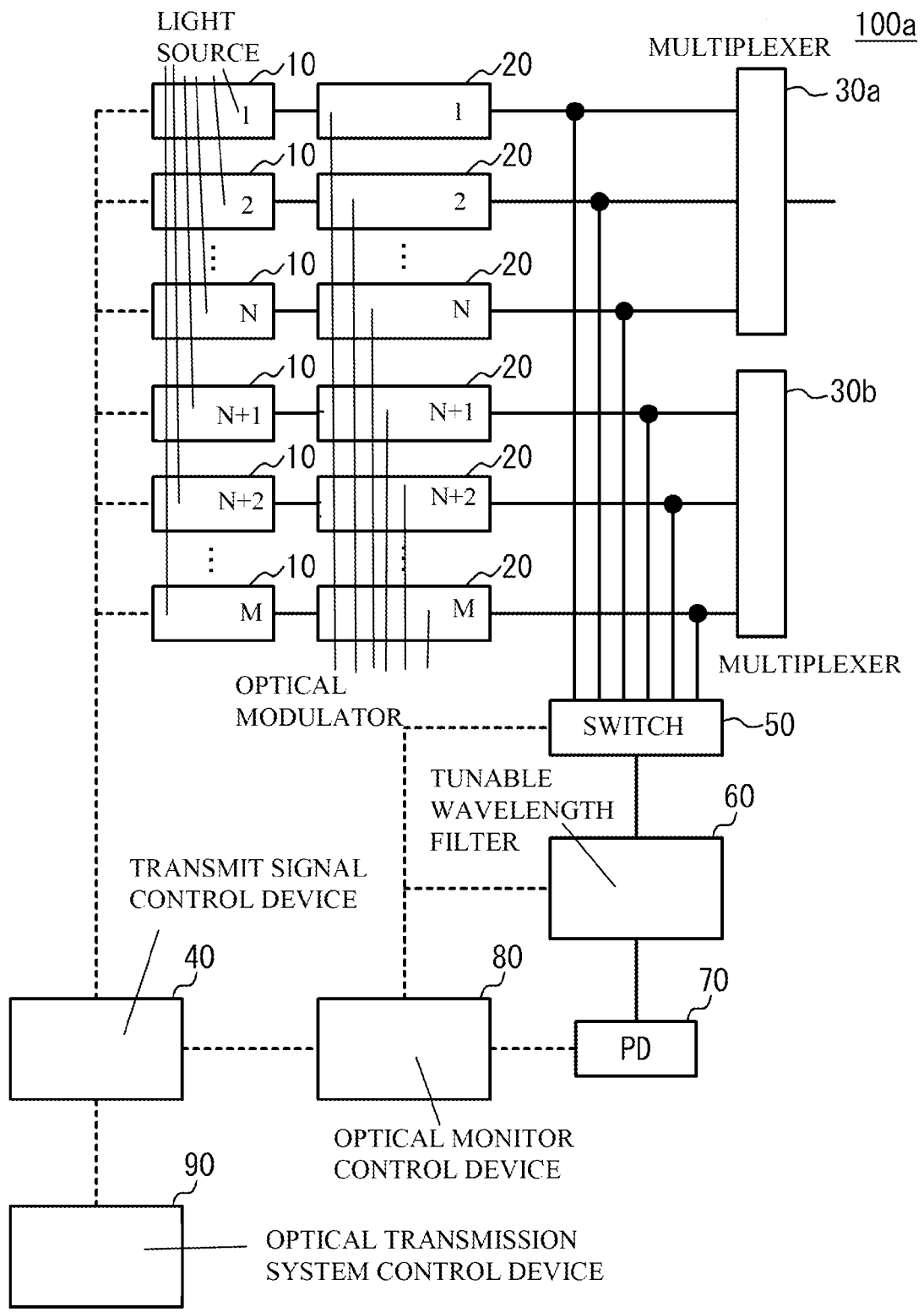
FIG. 9 illustrates a block diagram of a main structure of another optical transmission system.

FIG. 9 illustrates a block diagram of a main structure of another optical transmission system (an optical transmission system 100a). As illustrated in FIG. 9, the optical transmission system 100a has a plurality of multiplexers 30a and 30b. The multiplexer 30a multiplexes wavelength lights from the light sources 10 and the optical modulators 20 of channels 1 to N and transmits the wavelength-multiplexed light. The multiplexer 30b multiplexes wavelength lights from the light sources 10 and the optical modulators 20 of channels N+1 to M and transmits the wavelength-multiplexed light. In this way, a plurality of multiplexers may be provided. In a single filter sweeping, the optical transmission system 100a can detect a wavelength light of each channel with a wavelength interval that is wider than a wavelength interval of the wavelength-multiplexed light obtained in the multiplexers 30a and 30b.

FIG. 10 illustrates a block diagram of a main structure of another optical transmission system (an optical transmission system 100b). As illustrated in FIG. 10, the optical transmission system 100b is different from the optical transmission system 100 in a point that a multi-cast switch 30c is provided instead of the multiplexer 30.

Figures 11A, 11B:
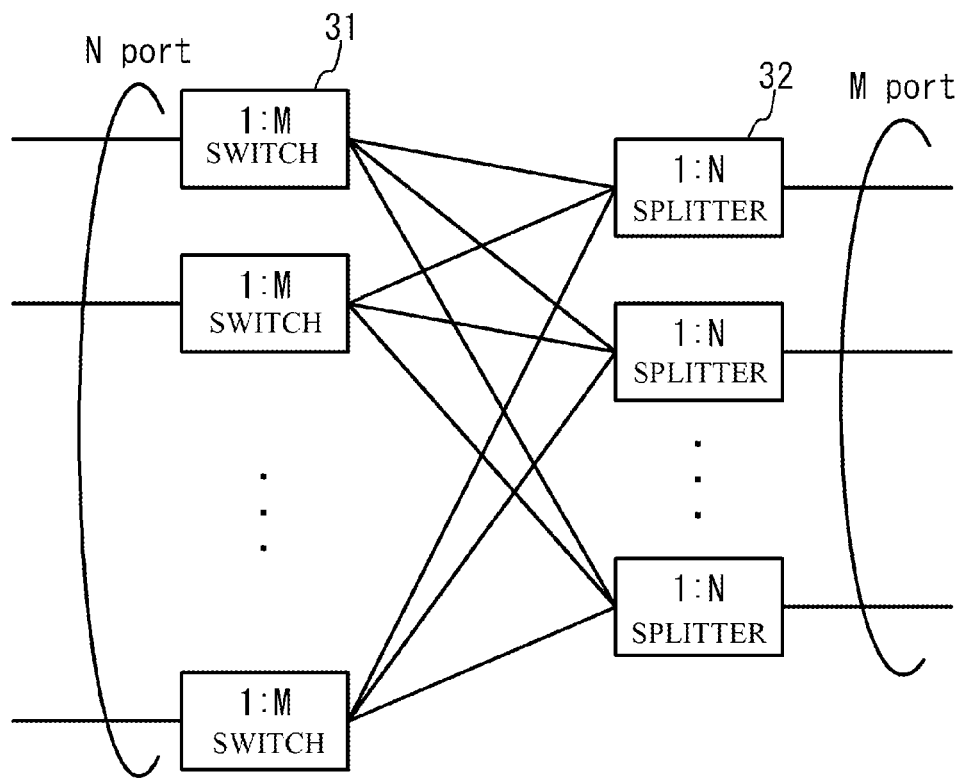
FIG. 11A illustrates a block diagram for describing details of a multi-cast switch.
FIG. 11B illustrates a correspondence table for describing a relation between a port number of a switch and each channel.

FIG. 11A illustrates a block diagram for describing details of the multi-cast switch 30c. As illustrated in FIG. 11A, the multi-cast switch 30c has M output ports with respect to the N channels. The multi-cast switch 30c has N switches 31 of 1:M and M splitters 32 of 1:N. Each of the 1:M switches 31 are connected to each of the 1:N splitters 32. Thus, each 1:N splitter 32 is capable of multiplexing wavelength lights of a desired combination and outputting the multiplexed lights. That is, the 1:N splitter 32 acts as a multiplexer. In this structure, it is not necessary that all of the light sources 10 of the N channels output a different wavelength. At least one of the light sources 10 has only to output a different wavelength.

FIG. 11B illustrates a correspondence table for describing a relation between a port number of the switch 50 and each channel. In FIG. 11B, a wavelength of the port 3 is the same as a wavelength of the port 6. In this example, port numbers 1, 2 and 3 have only to be selected in a first filter sweeping, port numbers 4 and 5 have only to be selected in a second filter sweeping, and a port number 6 has only to be selected in a third filter sweeping.

In the above-mentioned embodiment, the light source 10 is controlled when a wavelength of a wavelength light is corrected. However, the structure is not limited. For example, the wavelength may be corrected by controlling a carrier frequency of an optical signal output by the optical modulator 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmission system comprising:
    an optical transmission device that has three optical transmitters configured to output a wavelength different from each other and a multiplexer configured to multiplex three wavelength lights output by the three optical transmitters and output a multiplexed wavelength light;
    a tunable wavelength filter configured to continuously change a transparent wavelength in a wavelength range including wavelengths of the three wavelength lights;
    a switch configured to output each of the three wavelength lights that are branched before being fed into the multiplexer by a wavelength light in synchronization with changing of the transparent wavelength of the tunable wavelength filter; and
    a light-receiving element configured to detect an optical intensity of each wavelength light having passed through the tunable wavelength filter,
    wherein, during the changing of the transparent wavelength of the tunable wavelength filter, the switch does not output a wavelength light that is one of the three wavelength lights and is between other two wavelength lights of the three wavelength lights.

2. The optical transmission system as claimed in claim 1, wherein when an optical intensity of the wavelength light output by the switch during the changing is equal to a threshold or less, the tunable wavelength filter continuously changes the transparent wavelength in the wavelength range again with a wavelength selected by the switch being kept.

3. The optical transmission system as claimed in claim 1 further comprising a correct unit configured to correct an output wavelength of the optical transmitter in accordance with a detection result of the light-receiving element.

4. A method of testing an optical transmission device that has three optical transmitters that output a wavelength different from each other and a multiplexer configured to multiplex three wavelength lights output by the three optical transmitters and output a multiplexed wavelength light comprising:
    continuously changing a transparent wavelength of a tunable wavelength filter in a wavelength range including wavelengths of the three wavelength lights;
    outputting each of the three wavelength lights with a switch that are branched before being fed into the multiplexer by a wavelength light in synchronization with changing of the transparent wavelength of the tunable wavelength filter; and
    detecting an optical intensity of each wavelength light having passed through the tunable wavelength filter with a light-receiving element,
    wherein, during the changing of the transparent wavelength of the tunable wavelength filter, the switch does not output a wavelength light that is one of the three wavelength lights and is between other two wavelength lights of the three wavelength lights.

5. A computer readable, non-transitory medium storing a program that causes a computer to execute a process in an optical transmission device that has three optical transmitters that output a wavelength different from each other and a multiplexer configured to multiplex three wavelength lights output by the three optical transmitters and output a multiplexed wavelength light, the process comprising
    continuously changing a transparent wavelength of a tunable wavelength filter in a wavelength range including wavelengths of the three wavelength lights;
    outputting each of the three wavelength lights with a switch that are branched before being fed into the multiplexer by a wavelength light in synchronization with changing of the transparent wavelength of the tunable wavelength filter; and
    detecting an optical intensity of each wavelength light having passed through the tunable wavelength filter with a light-receiving element,
    wherein, during the changing of the transparent wavelength of the tunable wavelength filter, the switch does not output a wavelength light that is one of the three wavelength lights and is between other two wavelength lights of the three wavelength lights.

* * * * *